(12) United States Patent
Picard et al.

(10) Patent No.: US 11,976,461 B2
(45) Date of Patent: May 7, 2024

(54) SNAP JOINT AND METHOD OF USE

(71) Applicant: UNIVERSITÉ LAVAL, Québec (CA)

(72) Inventors: Laurence Picard, Québec (CA); André Bégin-Drolet, Québec (CA); Pierre Blanchet, Québec (CA)

(73) Assignee: UNIVERSITÉ LAVAL, Quebec (CA)

( * ) Notice: Subject to any disclaimer, the term of this patent is extended or adjusted under 35 U.S.C. 154(b) by 696 days.

(21) Appl. No.: 17/111,336

(22) Filed: Dec. 3, 2020

(65) Prior Publication Data
US 2022/0178135 A1    Jun. 9, 2022

(51) Int. Cl.
| F16B 21/06 | (2006.01) |
| E04B 1/48 | (2006.01) |
| F16B 21/16 | (2006.01) |
| F16B 37/08 | (2006.01) |

(52) U.S. Cl.
CPC ............ *E04B 1/48* (2013.01); *F16B 21/16* (2013.01); *F16B 37/0857* (2013.01)

(58) Field of Classification Search
CPC .... F16B 37/0857; F16B 21/06; F16B 21/073; A44B 11/2534; A44B 17/0011; Y10T 24/45602; Y10T 24/45775; Y10T 24/45785; Y10T 292/696; Y10T 292/1089; Y10T 292/0969
USPC ........................................................ 411/511
See application file for complete search history.

(56) References Cited

U.S. PATENT DOCUMENTS

| 2,526,790 A | 10/1950 | Wroblewski |
| 3,171,183 A * | 3/1965 | Johnston .............. A44C 5/2028 24/635 |
| 3,776,650 A | 12/1973 | Zenhausern |
| 4,016,914 A | 4/1977 | Zurko |
| 4,304,523 A | 12/1981 | Corsmeier et al. |
| 4,391,544 A | 7/1983 | Cadwallader |
| 4,553,873 A | 11/1985 | Salice |
| 4,908,916 A | 3/1990 | Berte |
| 5,151,104 A | 9/1992 | Kenna |

(Continued)

FOREIGN PATENT DOCUMENTS

| CN | 106968336 A | 7/2017 |
| CN | 107338867 A | 11/2017 |

(Continued)

OTHER PUBLICATIONS

Structural Quick Connection Joint System, Structural Quick Connection Joint System Prototype, Retrieved on Sep. 17, 2020 from: https://www.instructables.com/id/Structural-Quick-Connection-Joint-System-Prototype/.

*Primary Examiner* — Flemming Saether
(74) *Attorney, Agent, or Firm* — NORTON ROSE FULBRIGHT CANADA LLP

(57) ABSTRACT

A snap joint for securing construction modules together on a modular construction site, the snap joint comprising a male member mounted on a first construction module and a female member mounted on a second construction module. The female member housing locking members, a tumbler and biasing members biasing the locking members against the tumbler. The male member having shaft engageable within the female member, through a base stop of the tumbler, along a trigger path in a manner to push the tumbler out of interference with the locking members, thereby freeing the locking members to transversally engage with the shaft.

19 Claims, 5 Drawing Sheets

(56) References Cited

U.S. PATENT DOCUMENTS

| | | | |
|---|---|---|---|
| 5,598,612 | A | 2/1997 | Sheldon |
| 5,924,235 | A | 7/1999 | McCulley et al. |
| 6,317,941 | B1 | 11/2001 | Hamm, Jr. |
| 7,416,375 | B2 * | 8/2008 | Virdee ............... F16B 37/0864 411/433 |
| 9,677,276 | B2 | 6/2017 | Gilman |
| 9,920,504 | B2 | 3/2018 | Bierwith |
| 10,920,819 | B2 * | 2/2021 | Droste .................... F16B 31/02 |
| 10,927,874 | B2 * | 2/2021 | Wiley ................... F16B 13/124 |
| 11,072,923 | B2 * | 7/2021 | Dyer ......................... E04B 2/56 |
| 2007/0194173 | A1 * | 8/2007 | Paasche ............... B60N 2/3043 244/118.5 |
| 2013/0136532 | A1 | 5/2013 | Liao |
| 2014/0147198 | A1 | 5/2014 | Kim et al. |
| 2020/0256369 | A1 | 8/2020 | Gao |

FOREIGN PATENT DOCUMENTS

| | | |
|---|---|---|
| CN | 206769028 U | 12/2017 |
| CN | 207314526 U | 5/2018 |
| CN | 108756071 A | 11/2018 |
| CN | 108792597 A | 11/2018 |
| CN | 108999280 | 12/2018 |
| CN | 106996145 B | 3/2019 |
| CN | 109629683 A | 4/2019 |
| CN | 208917994 | 5/2019 |
| CN | 113863507 | 12/2021 |
| EP | 1103734 A1 | 5/2001 |
| EP | 1793131 B1 | 12/2008 |
| GB | 506646 A | 5/1939 |
| GB | 1249898 A | 10/1971 |
| GB | 2083159 A | 5/1984 |
| KR | 101259959 B1 | 5/2013 |
| KR | 20190091913 A | 8/2019 |

* cited by examiner

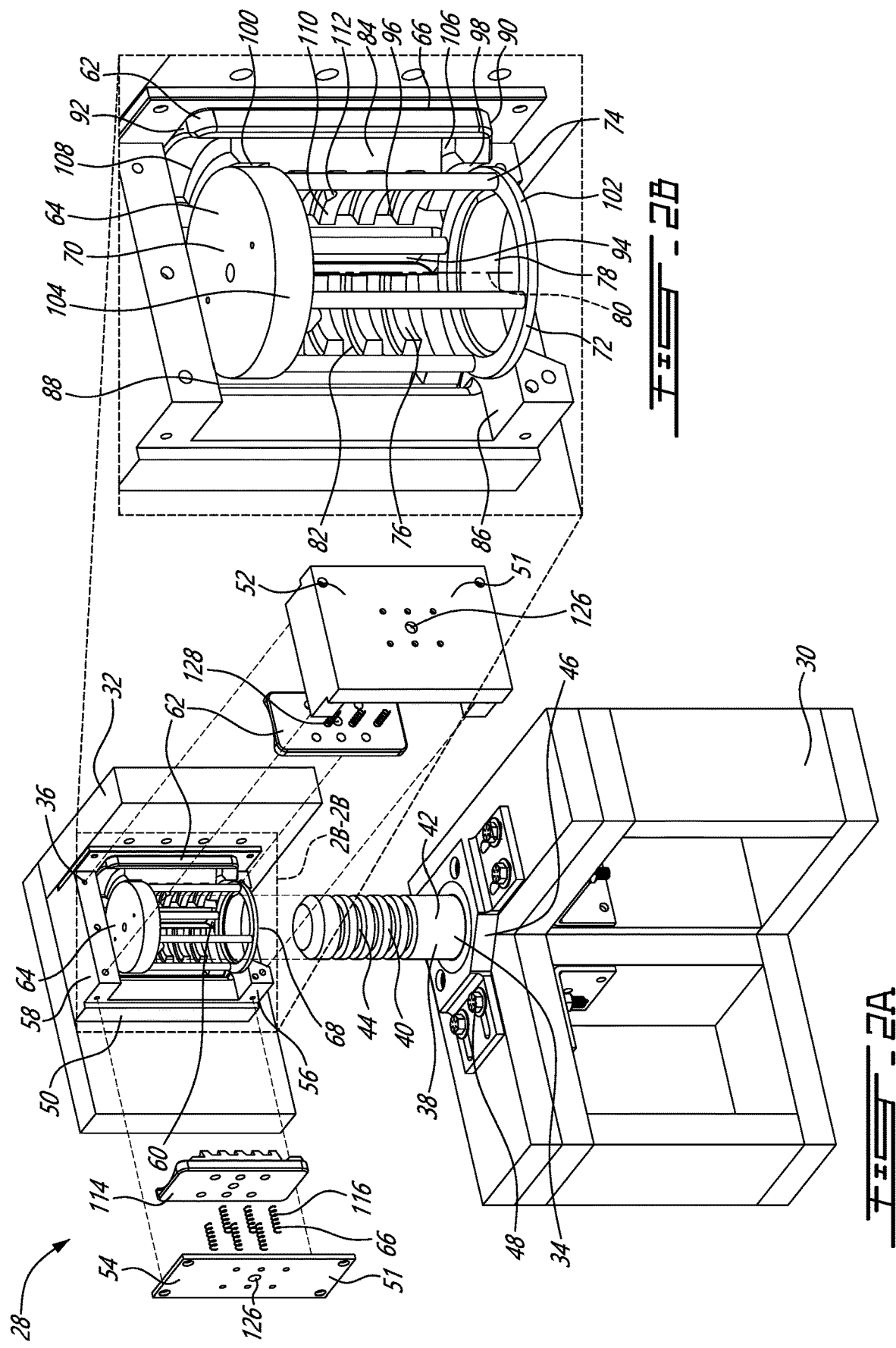

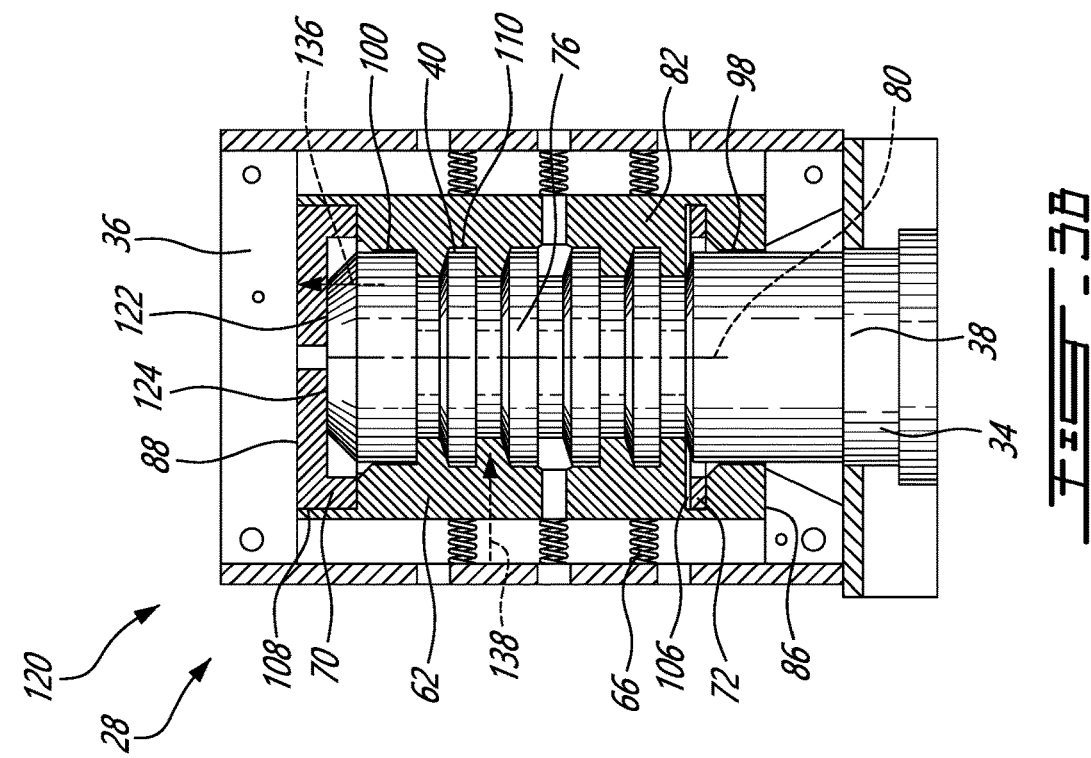
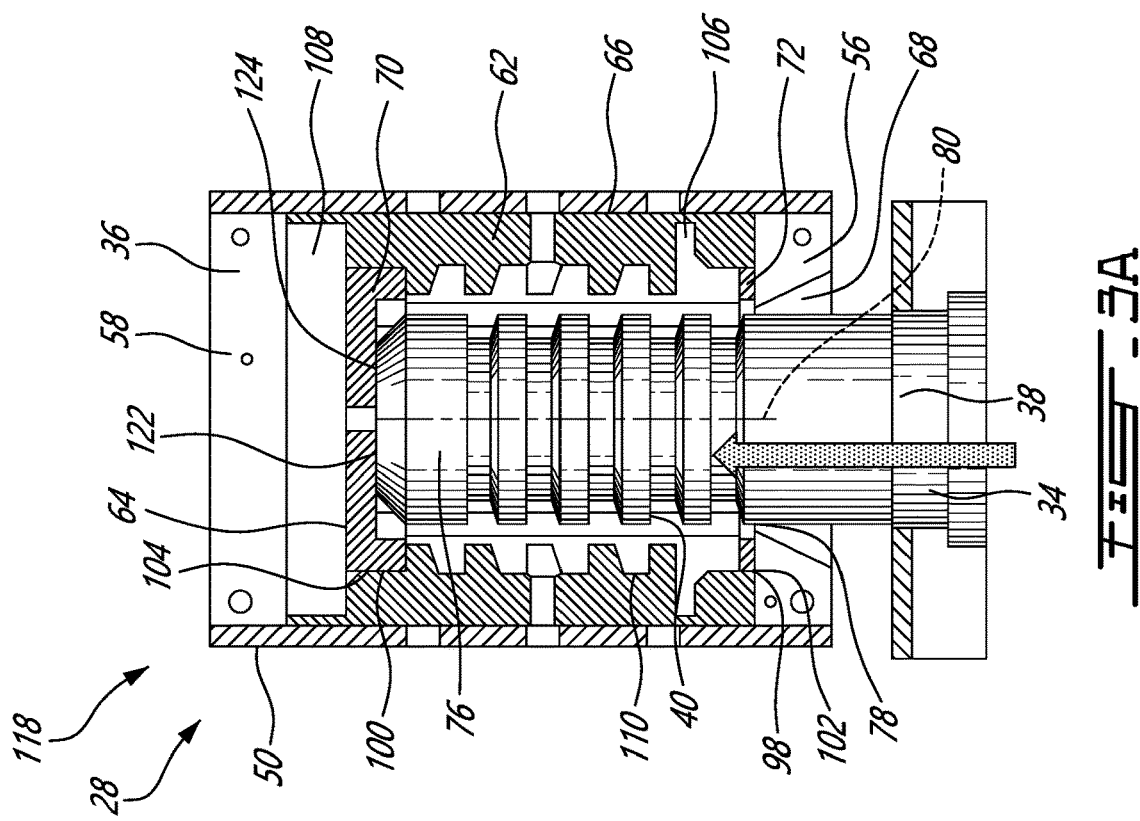

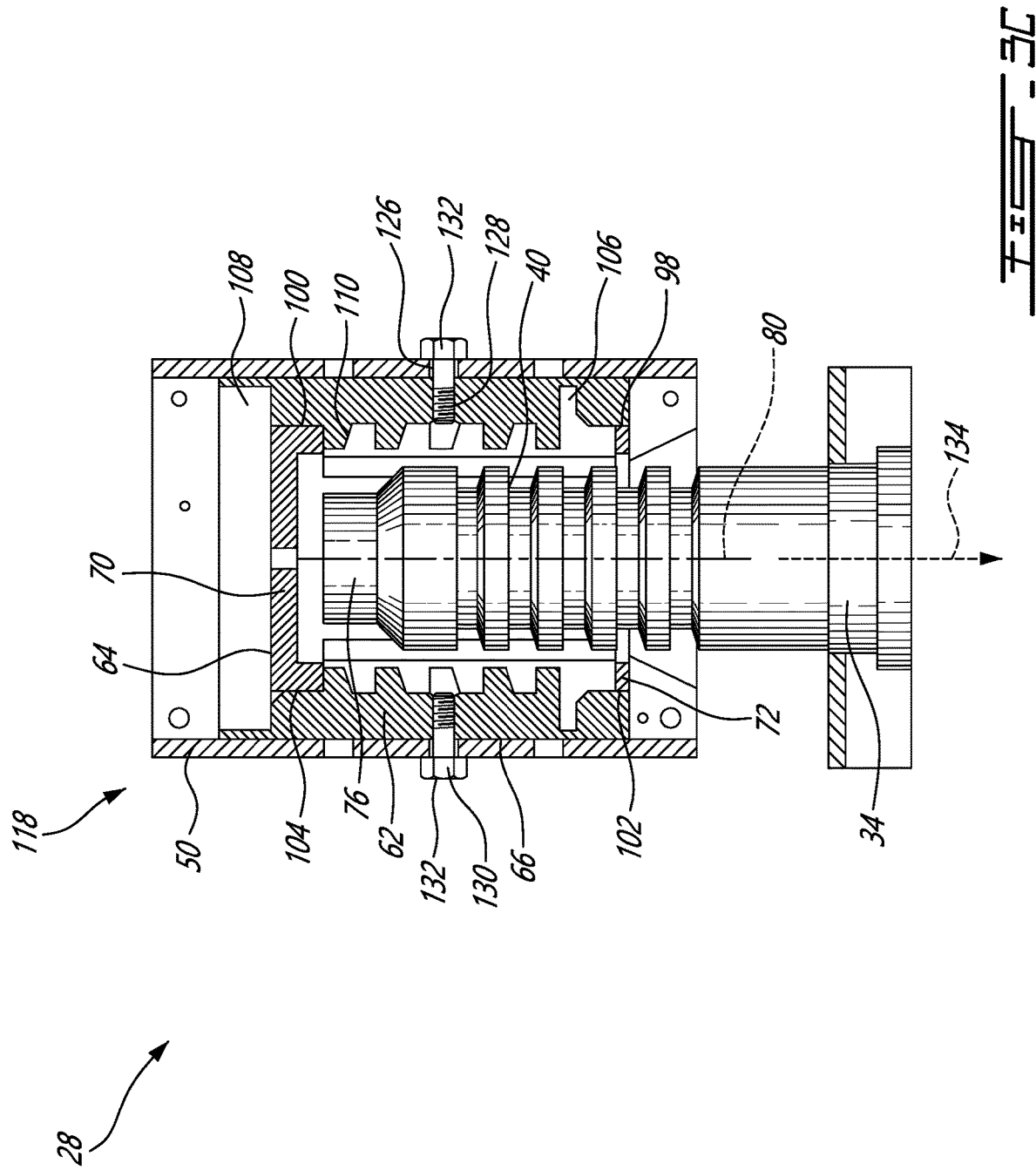

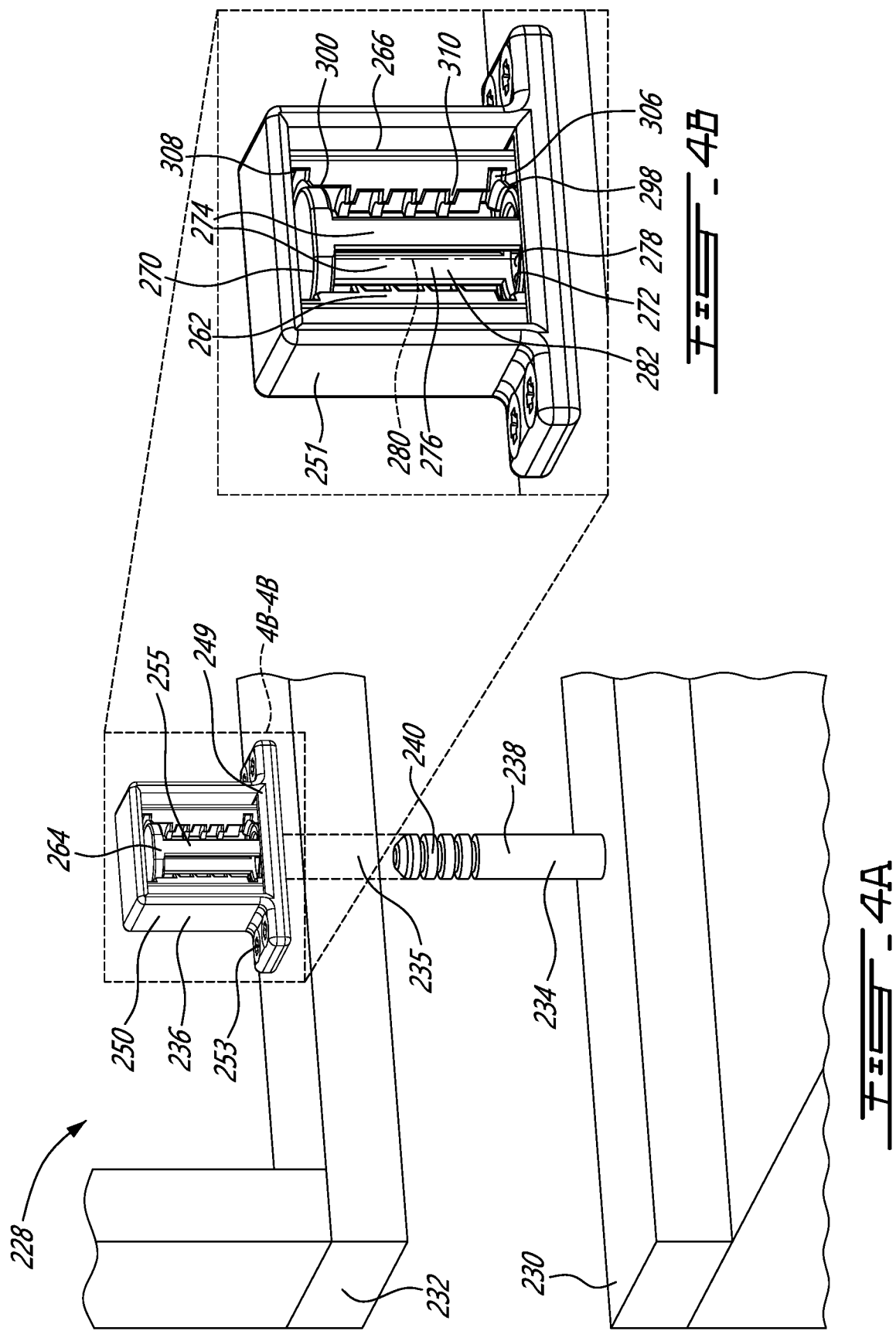

SNAP JOINT AND METHOD OF USE

FIELD

The improvements generally relate to the field of construction, more specifically of prefabricated and modular constructions and to a snap joint used during the on-site assembly of the construction.

BACKGROUND

In the field of modular construction, sometimes referred to as prefabricated construction or prefab, individual components which will be referred to herein as modules are built within the factory and subsequently transported to the intended site to be assembled into the final product. The modules can include a number of walls as well as a ceiling and/or a flooring for instance, and can form an entire dwelling (e.g. a living or working quarter) designed for sharing a wall with one or more adjacent dwelling, or a portion of a dwelling destined to be assembled adjacent one or more other portions of the dwelling, for instance. A typical motivation behind this type of approach is to increase the amount of work that can be done in the controlled factory environment and reduce the amount of work to be done on-site. This usually results in lower overall costs, as the factory work is typically of lower cost in comparison to the work done on a construction site.

The modules are handled and shipped, typically individually, to the construction site, where they are assembled with one another to create the building or structure (see FIG. 1 for instance).

In the beginning, modular constructions were limited to the development of low-rise, temporary or portable buildings. However, with the development of the associated technologies and the success of some use cases modular construction concepts have gained in popularity and their use has become more and more widespread and extended to multi-storey applications and a wider range of building types.

While former modular construction concepts were satisfactory to a certain degree for small scale modular buildings, aiming for bigger buildings deepens the need for new approaches.

SUMMARY

In one example assembly process, such as is shown in FIG. 1 for instance, the construction module is assembled by the skilled worker by first aligning the module with respect to the surrounding structures, and then fastening it in place. The placement of the module and its proper fastening typically ensures that appropriate rigidity and resistance between the modules are achieved, and that the construction is structurally sound as a whole, as well as sealed from the environment. The assembly process can require a significant amount of on-site workforce.

It was found that using snap joints can simplify the overall modular construction assembly process. However, to be acceptable in this type of application, a snap joint may need to comply with some or all of a number of potential requirements or specifications. Firstly, the snap joint may need to achieve a given level of structural strength once engaged, to ensure that the modules will not become disassembled over time or if extreme situations occur over time, as well as to ensure that the combined loadings of any one or more of self-weight, living-weight, snow-weight, wind forces and seismic forces can be withstood. Secondly, one may wish to reach a suitable pricing, which could allow the cost of the snap joint to override the inconveniences of alternate methods of on-site assembly. Thirdly, one may wish for the snap joint to be simple to use, which can involve some degree of ease of use and intuitiveness. It can be required, for instance, that the snap joint be designed in a manner for it to be virtually impossible to snap in any other than a perfectly acceptable configuration. Fourthly, one may wish to limit the snap joint's footprint/volume in the construction. Indeed, a snap joint design may fail on the market simply because it does not satisfy the user's requirements on a single one these numerous points.

It was found that the requirements of at least some embodiments could be satisfied by a snap joint design which uses locking members which, while biased transversally towards one another, could be temporarily held apart from one another in a housing by a component which will be referred to herein as a tumbler. The tumbler can have two levels which can be referred to as the base stop and the cap stop, and which can be longitudinally spaced apart from one another in a manner to provide two longitudinally spaced apart abutments able to maintain the parallelism of the locking members before, as well as throughout its solicitation by the male member when pushed out from interference with the locking members (notwithstanding the bias). The snap joint components such as the locking members and/or housing can be shaped with recesses designed to accommodate the base stop and the cap stop when the tumbler has been pushed, allowing the locking members to then freely penetrate into transversal openings made in the tumbler and securely engage with corresponding locking features of the shaft, at which point the shaft can no longer move lengthwisely relative to the locking members. The locking members can be trapped in a housing which is secured to a first module, and the shaft can be secured to a second module, in a manner that, the first module and the second module can no longer be moved relative one another in the orientation of the length of the shaft when the locking members are engaged with the shaft. The snap joint can further, and optionally, be provided with an unlocking feature via which the locking members can be externally pulled back to disengage from the male member if needed. During the engagement, it can be the shaft itself which is designed to engage a corresponding feature of the tumbler, such as the cap for instance, which can ensure that the tumbler's movement is only triggered once the shaft has been engaged into the housing by a certain length, ensuring that the locking member are not freed in any other configuration than the one where the shaft is fully and correctly engaged with the female member.

Accordingly, and in accordance with one aspect, there is provided a snap joint for securing construction modules together on a modular construction site, the snap joint comprising a male member mounted on a first construction module and a female member mounted on a second construction module. The female member housing a first locking member, a second locking member biased towards the first locking member, and a tumbler holding the second locking member against the bias, the tumbler having a cap stop held between a cap abutment of the first locking member and a cap abutment of the second locking member, and a base stop held between a base abutment of the first locking member and a base abutment of the second locking member, and a trigger path extending through the base stop to the cap stop. The male member having a shaft engageable through the base stop of the tumbler, along the trigger path, in a manner to push the tumbler out of interference with the locking members, thereby freeing the locking members to transversally engage with the shaft.

In another aspect, there is provided a method of securing construction modules together on a modular construction site with a snap joint comprising a male member mounted on a first construction module and a female member mounted on a second construction module. The female member housing a first locking member, a second locking member biased towards the first locking member, and a tumbler holding the second locking member against the bias. The tumbler having a cap stop held between cap abutments of the locking members, and a base stop held between base abutments of the locking members, and a trigger path extending through the base stop to the cap stop, the method comprising moving a shaft of the male member lengthwisely, along the trigger path, and pushing the tumbler with the shaft along the trigger path; and moving a locking member, extending along a tumbler length, transversally into a spacing freed by the movement of the tumbler and into transversal engagement with the shaft, thereby locking the male member to the female member.

In a further aspect, there is provided a snap joint for securing a first construction module to a second construction module at a modular construction site. The snap joint comprising a shaft securable to the first construction module, the shaft having an external surface protruding lengthwisely from the first construction module and having a first locking feature defined transversally in the external surface. The snap joint further comprising a housing securable to the second construction module, the housing having an aperture configured for receiving the shaft into the housing and a tumbler within the housing, having a cap stop lengthwisely spaced apart from a base stop, the tumbler having a shaft path leading from the aperture to the cap stop. The snap joint further comprising a locking member trapped between the tumbler and the housing, externally to the shaft path, the locking member having an internal surface being transversally biased against the tumbler, the locking member having a second locking feature defined transversally in the internal surface, the locking member further comprising a base stop recess defined transversally in the internal surface. The snap joint configured such that when the shaft is received through the aperture, along the shaft path, and pushes the tumbler, the tumbler frees the locking member in a manner for the first locking feature to engage the second locking feature while the base stop simultaneously engages the base stop recess, the locking member remaining lengthwisely trapped within the housing.

In accordance with yet another aspect, there is provided a snap joint comprising a male member and a female member, the female member housing a first locking member, a second locking member biased towards the first locking member, and a tumbler holding the second locking member against the bias, the tumbler having a cap stop held between a cap abutment of the first locking member and a cap abutment of the second locking member, and a base stop held between a base abutment of the first locking member and a base abutment of the second locking member, and a trigger path extending through the base stop to the cap stop; the male member having a shaft engageable through the base stop of the tumbler, along the trigger path, in a manner to push the tumbler out of interference with the locking members, thereby freeing the locking members to transversally engage with the shaft.

Many further features and combinations thereof concerning the present improvements will appear to those skilled in the art following a reading of the instant disclosure.

DESCRIPTION OF THE FIGURES

In the figures,

FIG. 2A is a partially exploded oblique view of a first embodiment of snap joint used to connect two modular pieces;

FIG. 2B is the portion 2B-2B of FIG. 2A, shown enlarged;

FIGS. 3A, 3B and 3C are side sectional views of the snap joint in an initially disengaged position, engaged position and disengaged position after being released, respectively;

FIG. 4A is an oblique view of yet another embodiment of the snap joint before assembly; and FIG. 4B is the portion 4B-4B of FIG. 4A, shown enlarged.

DETAILED DESCRIPTION

Figure 1:
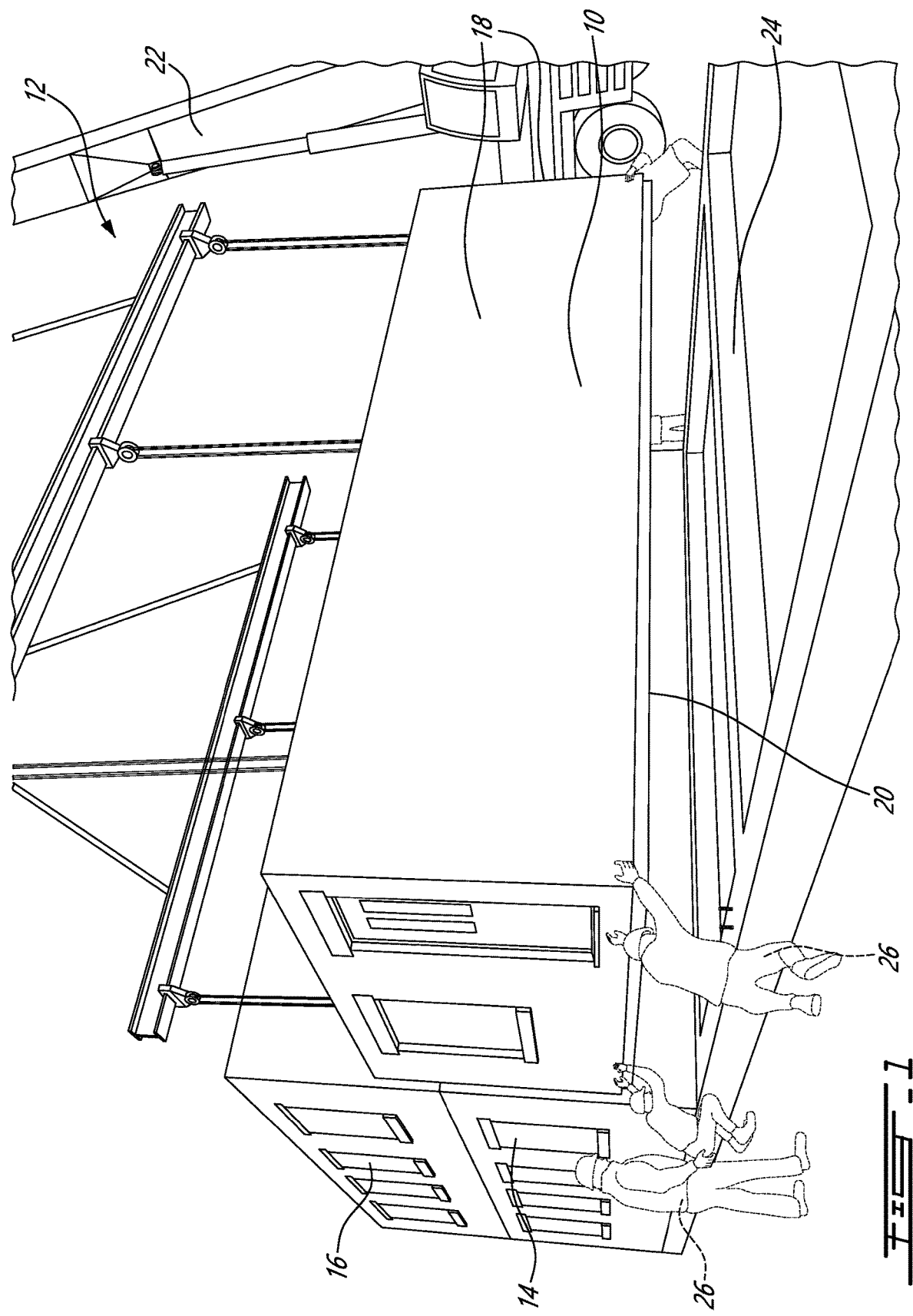
FIG. 1 is an oblique view of an example assembly step of a module in a module construction site.

FIG. 1 shows an oblique view of an example construction module 10 being put into place in a modular construction 12. In this particular example, two other modules 14, 16 have previously been placed and secured in place within the modular construction, a lower module 14 and an upper module 16.

In this example, each of the modules 10 includes a plurality of walls 18 and flooring 20, and therefore maintains its structure independently during transportation and assembly, such as when hoisted by a crane 22, for instance. The floorings are all based on a similar type of construction, and the flooring of the following module, being placed above the previous module, can act as the vertical partition between the two modules. In other embodiments, the modules 10 can be provided with ceilings but without floors 20, for instance, with the ceiling of the module below also acting as its floor, or can be provided with both floors and ceilings. The modules 10 have an internal volume which is designed to act as a dwelling space, which can either be for lodging or for working, for instance. Depending on the embodiment, one or more modules 10 may form a single dwelling unit. The modules 10 are designed to be assembled to one another, typically both side-by-side and on one top of the other to form more complex structures at the construction site. Many alternate embodiments are possible, and depending on the embodiment, more or less components can be factory-installed into the modules, such as pluming, siding, roofing, electric fixtures and wires, internal finishing, doors, windows, etc.

As can be seen in FIG. 1, in this example, the module 10 to be placed is being hoisted by the crane 22 to the appropriate location on a foundation 24 of the modular construction 12 in lateral abutment with the lower module 14 having been previously placed. The foundation 24 may be designed specifically in dimensions configured to accommodate the dimensions of the module 10. Once laid in a correct position, the module 10 can be secured to the foundation 24, and a following module 10 can be placed above it, similarly as the upper module 16 has been placed above the lower module 14. The superposed modules can be designed with suitable features allowing the walls of the superposed module to be precisely aligned with the walls of the lower module.

The modules 10 can be fastened and interconnected with surrounding structures, which can be construction foundations 24, other similar modules 14, 16 and/or different modules such as modular walls or modular ceilings for instance. Typically, this was done via the use of fasteners, brackets, and other intermediary equipment by the worker 26. As will now be explained, it was found that at least in some embodiments, using snap joints can be better than the former techniques.

Attention is now brought to FIG. 2A, showing an example snap joint 28 in accordance with a first embodiment. FIG. 2A shows a partially exploded oblique view, where the snap joint 28 is being used to connect a first module 30 and a second module 32 to one another. The snap joint 28 includes a male member 34 mounted to the first module 30 and a female member 36 mounted on the second module 32. As will further be discussed below, the male member 34 can be inserted into the female member 36 and locked into place by the female member 36 such as to secure the first module 30 to the second module 32.

In this particular example, the second module 32 is configured to be assembled above the first module 30. For the sake of clarity, only part of the first module 30 and second module 32 are shown in FIG. 2A, where the part of the first module 30 shown can correspond to a top corner of a first module 30 wall, whereas the part of the second module 32 shown can correspond to the corresponding bottom corner of a second module 32 flooring, for instance. It is understood that, while the snap joint 28 is shown used in the connection of a corner of two modules 30, 32 in this example, the snap joint 28 may be placed anywhere on the modules 30, 32, in any position and orientation as required for its assembly without departing from the present disclosure. For instance, the male 34 and female 36 members of the snap joint 28 can be placed laterally along corresponding support beams of modules 30, 32 to be assembled side-by-side. Further, it is understood that one or both parts of the snap joint 28 can be mounted, made integral to or otherwise associate to other structural elements of the modular construction. For instance, in some circumstances, the male member 34 of the snap joint 28 can be made integral to the foundation (24 in FIG. 1) of the modular construction, such as to permit assembly of a module (10 in FIG. 1) directly to the foundation (24 in FIG. 1).

Still referring to FIG. 2A, the male member 34 has a shaft 38 having a length extending away from the first module 30, in an orientation which will be referred to herein as "lengthwisely". The shaft 38 is configured to be lengthwisely received within the female member 36 and engaged by locking members 62 such as to lock the shaft 38 in place when fully inserted. The engagement of the male member 34 with the female member 36 permits the joining of the first module 30 to the second module 32.

The shaft 38 has a first locking feature 40 defined transversally along its external face 42, while the locking members 62 include a second locking feature 110 transversally defined along its internal surface 96. The first locking feature 40 and second locking feature 110 being complementary to one another. In this particular example, the first locking feature 40 is provided in the form of a plurality of locking channels 44 extending circumferentially along the external face 42 and being lengthwisely offset from one another, defining a generally female portion. The second locking feature 110 is provided in the form of a plurality of ribs 112 extending transversally from the internal surface 96 and being lengthwisely offset from one another, defining a generally male portion. The channels 44 and ribs 112 have complementary rectangular profiles and are configured such that the male portion (the ribs 112 in this embodiment), can be received within and engage with the female portion (i.e. the channels 44 in this embodiment).

It will be understood that other suitable locking features can be used for the first locking feature 40 and the second locking feature 110 in alternate embodiments. For instance, the male and female portions can be inversed such that the first locking feature 40 includes the male portion configured to be received in the female portion found on the second locking feature 110. In another alternate embodiment, the first locking feature 40 and second locking feature 110 can have a single channel and a single rib that engages with one another. In yet another embodiment, the channel 44 of the first locking feature 40 and the rib 112 of the second locking feature 110 can have a profile differing from the generally rectangular profile. In yet another embodiment, the first locking feature 40 and second locking feature can both have a combination of male portions and female portions made complementary to one another.

In this example, the shaft 38 is made integral to a base 46. The base 46 being fastened to the first module 30 using fasteners 48. It is understood that the male member 34 can be mounted to the first module 30 by any suitable means and that, in alternate embodiments, the shaft 38 may be made integral to the first module 30 such as to omit the use of a base 46.

Still referring to FIG. 2A, the female member 36 comprises a housing 50 with a plurality of housing walls 51, a base end 56 and a cap end 58 defining a cavity 60. The female member 36 housing the locking members 62, a tumbler 64 and biasing members 66 within. The base end 56 includes an aperture 68 configured to lengthwisely receive the shaft 38 of the male member 34 within the cavity 60 of the housing 50.

The housing walls 51 include two housing segments 52 configured to be mounted to the second module 32 and to each other to define opposite sides of the housing walls 51. The housing further includes two side walls 54 configured to be mounted orthogonally to the housing segments 52. In this particular example, the base end 56 and the cap end 58 are partially defined on each of the housing segments 52, being integral to and extend transversally from the housing segments 52 such as to make the cap end 58 and the base end 56 whole when the housing segments 52 are assembled. The base end 56 and the cap end 58 are lengthwisely separate from one another at opposite ends of the housing 50, encompassing the housing cavity 60 between the base end 56 and the cap end 58. In an alternate embodiment, the side walls can be absent.

It is understood that alternate housing structures can be used without departing from the present disclosure. For instance, in an alternate embodiment, one or various of the side walls 54 can also be mounted to the second module 32. In yet another embodiment, the base end 56 and/or cap end 58 can be separate from the housing segments 52 and configured to be assembled to the housing walls 51 separate from the housing segments 52. In yet another embodiment, the housing 50 can be machined from a singular piece of material, wherein the cavity 60 is machined via the introduction of the machining tool through the aperture 68 at the base end 56 of the housing 50 for instance.

Attention is now directed to FIG. 2B, showing the portion 2B-2B of FIG. 2A, enlarged, where the features of the locking members 62 and the tumbler 64 within the housing cavity 60 are seen.

In this example, the tumbler 64 comprises a cap stop 70 and a base stop 72, lengthwisely spaced apart from one another and connected to each other via rigid links 74, defining a tumbler cavity 76 within. The cap stop 70 is placed in proximity to the cap end 58 of the housing 50 whereas the base stop 72 is placed in proximity the base end 56 of the housing 50. The cap stop 70 has a solid cylindrical structure, whereas the base stop 72 has an annular structure, defining a tumbler aperture 78 which configured to receive the shaft 38 of the male member 34 within. A trigger path 80 is lengthwisely defined between the base stop 72 and the cap stop 70 of the tumbler 64, within the tumbler cavity 76. The tumbler 64 includes transversal openings 82 which are defined between the cap stop 70, the base stop 72 and pairs of adjacent links 74 connecting the cap stop 70 and the base stop 72. As will further be discussed below, the transversal openings 82 permit the second locking feature 110 of the locking members 62 to extend within the tumbler cavity 76 when the female member is to engage the male member.

In this particular example and as perhaps best seen in FIG. 2B, the cap stop 70 and base stop 72 have corresponding outer diameters and are connected to one another by four rigid cylindrical links 74 circumferentially offset from one another around the base stop 72 and the cap stop 70. The tumbler 64 includes four transversal openings 82 leading to the tumbler cavity 76 between the adjacent links 74. It will, however, be understood that varying amount of links 74 and transversal openings 82 can be used in alternate embodiments.

As will be further discussed below, the tumbler aperture 78 is aligned with the base end aperture 68 of the housing 50, such as to permit the insertion of the shaft 38 within the tumbler cavity 76 along the trigger path 80, through the housing aperture 68 and the tumbler aperture 78.

As described above, the locking members 62 are housed within the housing 50. The locking members 62 comprise a body 84 extending lengthwisely from the internal face of the base end 86 of the housing 50 to the internal face of the cap end 88 of the housing 50. The base surface 90 of the locking member 62 abutting with the internal face of the base end 86 of the housing 50, and the cap surface 92 of the locking member 62 abutting with the internal face of the cap end 88 of the housing 50. The locking member 62 being lengthwisely trapped within the housing 50, while being allowed of transversal sliding along the internal face of the base end 86 and the internal face of the cap end 88.

As perhaps best seen in FIG. 2A, the locking members 62 are transversally positioned between the housing walls 51 and the tumbler 64, and biased towards the tumbler 64 via biasing members 66 transversally positioned between the locking members 62 and the housing walls 51. In this particular embodiment, four locking members 62 are placed circumferentially around the tumbler 64 and circumferentially aligned with the transversal openings 82 of the tumbler 64 in such a manner for the tumbler links 74 to extend within gaps 94 between adjacent locking members 62. In this example, each one of the locking members 62 is biased by corresponding biasing members 66 that are aligned with and held in place by a corresponding housing wall 51.

Returning to FIG. 2B, the locking members 62 include an internal surface 96 facing the tumbler 64 which includes a base abutment 98 and a cap abutment 100 configured to transversally abut the base stop side 102 and the cap stop side 104 of the tumbler 64, respectively. The locking member 62 internal surface 96 further includes a base stop recess 106 and a cap stop recess 108 transversally defined within the internal surface 96, and configured to laterally receive at least part of the base stop 72 and the cap stop 70 of the tumbler 64, respectively. The base stop recess 106 and cap stop recess 108 being lengthwisely offset from the base abutment 98 and cap abutment 100 in the same direction and by the same distance. More specifically, in this example, the base stop recess 106 and cap stop recess 108 are lengthwisely adjacent to the base abutment 98 and cap abutment 100, respectively. The second locking feature 110 extends transversally from the internal surface 96 between the cap stop recess 108 and the base stop recess 106 of the locking members 62.

As will be further discussed below, the base abutment 98 and cap abutment 100 are transversally placed such that, when the tumbler 64 is placed in a manner for the base stop 72 to abut against the base abutment 98 and the cap stop 70 to abut against the cap abutment 100 of the locking members 62 (see also FIG. 3A), the second locking feature 110 is held away from the tumbler cavity 76, against the bias generated by the biasing member 66. This arrangement will be referred to here below as the snap joint 28 being in a disengaged position 118 (seen in FIGS. 3A and 3C). In contrast, the base stop recess 106 and cap stop recess 108 are transversally defined such that, when the tumbler 64 is placed in a manner for the base stop 72 and the cap stop 70 of the tumbler 64 to be engaged within the base stop recess 106 and cap stop recess 108, respectively (i.e. such as shown in FIG. 3B), the second locking feature 110 can extend through the transversal openings 82 of the tumbler 64 into the tumbler cavity 76. This arrangement will be referred to here below as the snap joint 28 being the engaged position 120 (seen in FIG. 3B).

Returning to FIG. 2A. the locking members 62 includes an external surface 114 facing the housing walls 51 which can be acted upon by the biasing members 66 in a manner to bias the locking member 62 towards the tumbler 64 and bias opposite locking members 62 towards one another. In this particular example, the external surface 114 is a uniform surface capable of receiving a plurality of springs 116. It is understood that any other suitable external surface 114 profile can be used and that resilient members other than springs can be used as the biasing members 66 in alternate embodiments.

Reference will now be made to FIGS. 3A and 3B showing transversal cross-section views of the example snap joint 28 in a disengaged position 118, before engagement of the male member 34 with the female member 36, and in an engaged position 120, after engagement of the male member 34 with the female member 36, respectively.

Attention will first be made to FIG. 3A showing the snap joint 28 in a disengaged position 118. In this position, the base stop side 102 of the base stop 72 and the cap stop side 104 of the cap stop 70 abut against the base abutment 98 and cap abutment 100 of the locking members 62, respectively. The locking members 62 being transversally biased towards the tumbler 64 via the biasing members 66 and held in place by the abutment with the tumbler 64. The base stop 72 and cap stop 70 transversally holding the locking members 62 against the bias of the biasing member 66 and away from the tumbler cavity 76 such that the tumbler cavity 76 is free to receive the shaft 38 of the male member 34 within as shown.

Still referring to FIG. 3A, when the modules are to be assembled, the shaft 38 of the male member 34 is inserted lengthwisely, along the trigger path 80, through the base end 56 aperture 68 of the housing 50 and through the tumbler aperture 78 of the base stop 72 such as to extend within the tumbler cavity 76. As the tumbler 64 holds the locking members 62 away from the tumbler cavity 76 in the disengaged position 118, the shaft 38 can be freely inserted or removed as required by the modular construction. The shaft 38 can be inserted along the trigger path 80 until its distal end 122 abuts against the inner surface 124 of the cap stop 70.

As perhaps best seen in FIG. 3B, when the shaft 38 is further pushed and inserted along the trigger path 80, the tumbler 64 is likewise longitudinally displaced 136 along the trigger path 80, while the locking members 62 are lengthwisely held in place by the base end 56 and cap end 58 of the housing 50. The base stop 72 and the cap stop 70 of the tumbler 64 are displaced congruously, sliding lengthwisely along and away from the base abutment 98 and cap abutment 100 of the locking members 62 towards the base stop recess 106 and cap stop recess 108, respectively.

As the base stop 72 and cap stop 70 simultaneously reach the base stop recess 106 and cap stop recess 108, respectively, the transversally biased locking members 62 are released and transversally slide 138, along the internal surface of the base end 86 and the internal surface of the cap end 88 of the housing 50, towards the tumbler cavity 76. The base stop 72 and cap stop 70 of the tumbler 64 engaging with the base stop recess 106 and cap stop recess 108, respectively, permitting the second locking feature 110 to extend through the transversal opening 82 into the tumbler cavity 76 and into engagement with the first locking feature 40 of the shaft 38. At this point, the male member 34 is trapped within the female member 36 and the snap joint 28 is considered in the engaged position 120.

It will be appreciated that the combined tumbler 64 and locking members 62 structure described above permits the locking members 62 to be held parallel to one another in both the disengaged 118 and engaged position 120, while further capable of maintaining their parallelism throughout the locking procedure. As the base stop 72 and the cap stop 70 move congruously from the base abutment 98 and the cap abutment 100, respectively, the tumbler 64 releases the locking members 62 simultaneously, permitting the locking members 62 to transversally slide 138 towards the shaft 38 in a simultaneous and parallel fashion.

It will further be appreciated that the combined tumbler 64 and locking members 62 structure described above permits a certain amount of fool-proofness to be ascertained. As locking members 62 are lengthwisely trapped within the housing 50, while being held away from the tumbler cavity 76 by the tumbler 64, the male member 34 can be misaligned, and can even extend through a transversal opening 82 of the tumbler 64 and collide with a portion of a locking member 62, without risking accidentally displacing the tumbler 64 and placing the snap joint 28 in an engaged position 120 without the male member 34. This may permit a user to realign the module being assembled as required before fully inserting the male member 34, displacing 136 the tumbler 64 and locking the shaft 38 in place.

It will be understood that the force required to push and displace 136 the tumbler 64, such as to free the locking members 62, can be adjusted by increasing or decreasing the rate of the biasing member 66, such as to correspondingly adjusting the frictional forces to be overcome along the base abutment 98 and the cap abutment 100 during the sliding action of the tumbler 64 along the trigger path 80. It will be understood that other methods of adjusting the force required to displace the tumbler 64 can be used in alternate embodiments. For instance, adjusting the force required to displace 136 the tumbler 64 can be achieved by adjusting the materials of the shaft 38, of the locking members 62 or both. In yet another embodiment, the base abutment 98 or cap abutment 100 can be coated with a material permitting the modulate the frictional forces required to displace the tumbler 64 from the locking members abutments 98,100.

Returning to FIG. 2A, the housing walls 51 include disengagement apertures 126 in order to permit reverting the snap joint 28 to the disengaged position 120 after being engaged. In this particular example, a disengagement aperture 126 is defined in each one of the housing walls 51 and a threaded bore 128 is included within the locking members 62. The threaded bore 128 is aligned and accessible from the disengagement aperture 126. As perhaps best seen in FIG. 3C, showing a side sectional view of the exemplary snap joint 28 having been returned to a disengaged position 118, fasteners 132 have been used as a disengagement tool 130 for sliding the locking members 62 away from the male member 34 and reverting the snap joint 28 to a disengaged position 118. The fasteners 132 have been inserted through the disengagement aperture 126 and threaded into the threaded bore 128 of the locking member 62. As the fastener 132 is rotated, the fastener 132 thread engages with the threaded bore 128 and generates a pulling force, such as to transversally slide the locking members 62 against the bias and away from the tumbler cavity 76. The sliding of the locking members 62 effectively retreating the second locking feature 110 from the first locking feature 40 and disengaging the male member 34 which can be freely removed 134 from the tumbler cavity 76 along the trigger path 80.

As the locking members 62 are pulled away from the tumbler cavity 76, the base stop 72 and the cap stop 70 are disengaged from the base stop recess 106 and the cap stop recess 108, accordingly, and are lengthwisely moved along the trigger path 80 into the disengaged position 118, such that the base stop side 102 abuts against the base abutment 98 and the cap stop side 104 abuts against the cap abutment 100 of the locking members 62, respectively. At this point, the fasteners 132 can be removed, permitting the biasing members 66 to bias the locking members 62 towards the tumbler 64 once again. The snap joint 28 may once again be used for assembly of modules by receiving the male member 34 as described above with reference to FIGS. 3A and 3B.

Attention is now directed to FIG. 4A, showing another embodiment of the snap joint 228. For the sake of conciseness, only the differences with the previous embodiments will be discussed below. In this example, the second module 232 can correspond to a modular wall configured to be assembled via the use of a snap joint 228 with the first module 230, which can be a modular flooring, for instance. Contrarily to the embodiment described above and shown in FIG. 2A, the female member 236 is mounted on the second module 232 in a manner to receive the male member 234 through a module bore 235, interposing the second module 232 between the female member 236 and the mounting point of the male member 234.

Still referring to FIG. 4A, the male member 234 is mounted directly to the first module 230. This is achieved by having a shaft head (not shown) on the end opposite that of the first locking feature 240 which sits in and/or engages with a counterbore (now shown) in the first module 230. It will be understood that any other suitable means of mounting the male member 234 to the first module 230 can be used without in alternate embodiments. For instance, in an alternate embodiment, the male member 234 can be soldered to the first module 230.

In this example, the female member 236 contains a unitary housing 250 comprising a housing base 249 mountable to the second module 232. The housing base 249 being secured to the second module 232 via fasteners 253. It will, however, be understood that other mounting methods can be used without departing from the present disclosure.

As perhaps best seen in FIG. 4B, in this particular example, the female member 236 comprises a housing 250 with two side walls 251 and two housing openings 255, as well as a tumbler 264 and two locking members 262 circumferentially placed around the tumbler 264. The locking members 262 being opposite to one another, aligned with the side walls 251 and biased towards one another. The tumbler 264 comprising two links 274 and two transversal openings 282. As with the embodiment described above, the locking members 262 are biased against the tumbler 264 via the action of biasing members 266 placed between the locking member 262 and each corresponding side wall 251.

The male member 234 can be engaged with the female member 236 via the insertion of the shaft 238 through the module bore 235, the housing aperture and the tumbler aperture 278, such as to extend within the tumbler cavity 276, and the displacement of the tumbler 264 lengthwisely along the trigger path 280. The displacement of the tumbler 264 releasing the locking members 262 from abutment with the tumbler 264 via the base abutment 298 and the cap abutment 300 and allowing the locking members 262 to transversally slide towards the tumbler cavity 276. The base stop 272 engaging with the base stop recess 306, the cap stop 270 engaging with the cap stop recess 308 and the second locking features 310 extending through the transversal openings 282 into the tumbler cavity 276 and into engagement with the first locking feature 240 of the male member 234.

In this particular embodiment, disengagement of the snap joint 228 after displacement of the tumbler 264 and engagement with the male member 234 can be achieved by engaging the locking members 262 via the housing openings 255 and transversally sliding the locking members 262 towards the side walls 251, against the bias. The sliding of the locking members 262 permits the disengagement of the cap stop 270 from the cap stop recess 308 and the base stop 272 from the base stop recess 306, and allows displacing the tumbler 264 into the disengaged position via the housing openings 255, such that the base stop 272 abuts the base abutment 298 and the cap stop 270 abuts the cap abutment 300 of the locking members 262, respectively.

As can be understood, the examples described above and illustrated are intended to be exemplary only. One skilled in the art will recognize that changes may be made to the embodiments described without departing from the scope of the invention disclosed.

For instance, in the above examples, the male member shaft has a generally circular cross-section, and the components within the female member have features with a corresponding shape in order to properly interface with the male member. It will be understood that the male member and/or the corresponding components of the female member can be adjusted to other shapes without departing from the present disclosure. For instance, in an alternate embodiment, the shaft can have a generally rectangular cross-section. Similarly, the female member can have a rectangular aperture in the base end, and/or a tumbler with a rectangular base stop, a rectangular cap stop as well as a a rectangular tumbler aperture. In this alternate embodiment, the locking members have a generally flat second locking feature corresponding to the profile of the external face of the shaft. It will thus be understood that various shapes and arrangements can be used without departing from the present disclosure.

While the above examples show locking members with both a cap abutment, a cap stop recess, a base abutment and a base stop recess, it will be understood that the location or relative position of one or many of these features can be altered in alternate embodiments. For instance, the locking members can omit having a cap stop recess and the snap joint can instead include a cap stop socket defined in the internal surface of the cap end of the housing. The cap stop socket being lengthwisely aligned with the cap stop of the tumbler. In this example, when the tumbler is displaced along the trigger path, the cap stop slides lengthwisely into the cap stop socket, such as to disengage with the cap abutment and allow the cap surface of the locking member to transversally slide along the internal face of the cap end of the housing, towards the tumbler cavity and into engagement with the inserted male member. In yet another embodiment, the relative distance between the cap/base abutment and the cap/base stop recess can be increased or decreased in order to modulate the amount travel of the tumbler along the trigger path required before the release of the locking members.

While the above examples show a snap joint wherein various of the locking members transversally slide within the housing toward the tumbler, it will be understood that in alternate embodiments, at least one of the locking members is made integral to or permanently mounted to the housing. For instance, in an alternate embodiment, a female member containing two locking members circumferentially placed around the tumbler and opposed to one another can contain a first locking member made integral to the housing, while the second locking member is biased towards the first locking member. The tumbler holding the second locking member against the bias as described above. When in the engaged position, second locking member engaging with the shaft and biasing the shaft towards the first locking member, such as to engage the shaft with second locking feature of both the first and second locking members.

While the snap joint has been presented above as being applied to the field of modular constructions, it will be understood that the snap joint concept presented herein can also be applied to alternate applications, such as furniture assembly, the fixation of outer cladding on buildings, the assembly of temporary event structures and/or in the general field of delivery, for instance, where an increase number of modular solutions are being sought in order to gain in delivery efficiency. The snap joint is further applicable to the field of clothing, particularly sports clothing, in which a quick and secure connection is often sought.

Still other modifications which fall within the scope of the present invention will be apparent to those skilled in the art, in light of a review of this disclosure, and such modifications are intended to fall within the appended claims.

What is claimed is:

1. A snap joint for securing construction modules together on a modular construction site, the snap joint comprising a male member mounted on a first construction module and a female member mounted on a second construction module, the female member housing a first locking member, a second locking member biased towards the first locking member, and a tumbler holding the second locking member against the bias, the tumbler having a cap stop held between a cap abutment of the first locking member and a cap abutment of the second locking member, and a base stop held between a base abutment of the first locking member and a base abutment of the second locking member, and a trigger path extending through the base stop to the cap stop, the male member having a shaft engageable through the base stop of the tumbler, along the trigger path, in a manner to push the tumbler out of interference with the locking members, thereby freeing the locking members to transversally engage with the shaft.

2. The snap joint of claim 1 wherein the first locking member is biased towards the second locking member, the tumbler holding the first locking member against the bias.

3. The snap joint of claim 1 wherein the locking members further comprise a base stop recess configured to be engaged by the base stop when the tumbler is pushed out of interference with the locking members.

4. The snap joint of claim 1 wherein the locking members further comprise a cap stop recess configured to be engaged by the cap stop when the tumbler is pushed out of interference with the locking members.

5. The snap joint of claim 1 wherein the base stop and cap stop hold parallelism of the locking members relative to one another.

6. The snap joint of claim 1 wherein the locking members are transversally engaged with the shaft between the cap stop and the base stop of the tumbler.

7. The snap joint of claim 1 wherein the locking members are transversally engaged with the shaft through transversal openings of the tumbler.

8. The snap joint of claim 1 wherein a force required to push the tumbler out of interference with the locking members is adjusted by adjusting the rate of a biasing member generating the bias.

9. The snap joint of claim 8 wherein the biasing member is a spring.

10. The snap joint of claim 1 wherein the female member comprises a housing, the housing having a base end and a cap end, the locking members being trapped lengthwisely, within the housing, between the base end and the cap end.

11. The snap joint of claim 10 wherein the base end has an aperture configured for receiving the shaft into the trigger path.

12. The snap joint of claim 1 wherein the locking members are circumferentially placed on opposite ends of the tumbler.

13. The snap joint of claim 1 wherein the female member further houses a third locking member and a fourth locking member circumferentially offset from the first locking member and second locking member.

14. The snap joint of claim 1 wherein the cap stop has a solid cylindrical structure.

15. The snap joint of claim 1 wherein the base stop has an annular structure and defines a tumbler aperture configured for receiving the shaft.

16. The snap joint of claim 1 wherein the female member further comprises a disengagement aperture configured for receiving a disengagement tool in a manner to transversally move the locking members against the bias, thereby releasing the shaft and allowing the placement of the tumbler such that the cap stop is between the cap abutment of the first locking member and the cap abutment of the second locking member, and the base stop is between the base abutment of the first locking member and the base abutment of the second locking member.

17. The snap joint of claim 16 wherein the disengagement tool is a fastener and the locking members further include a threaded bore configured to engage with the fastener when the fastener is received through the disengagement aperture.

18. A female member for use with a male member of a snap joint for securing construction modules together on a modular construction site, the female member comprising:
a housing a first locking member, a second locking member biased towards the first locking member, and a tumbler holding the second locking member against the bias, the tumbler having a cap stop held between a cap abutment of the first locking member and a cap abutment of the second locking member, and a base stop held between a base abutment of the first locking member and a base abutment of the second locking member, the housing having an aperture for receiving a shaft of the male member longitudinally between the locking members and into engagement with the tumbler in a manner to push the tumbler out of interference with the locking members, thereby freeing the locking members to transversally engage with the shaft; wherein the cap stop and the base stop are spaced apart from one another in the longitudinal orientation and maintain parallelism of the locking members.

19. The female member of claim 18 wherein the shaft has a first locking feature defined transversally along an external face, and the first locking member and the second locking member include a second locking feature transversally defined along an internal surface, the first locking feature and the second locking feature being complementary to one another, the first locking feature being provided in the form of a plurality of locking channels extending circumferentially along the external face and being longitudinally offset from one another, the second locking feature being provided in the form of a plurality of ribs extending transversally from the internal surface and being longitudinally offset from one another.

\* \* \* \* \*